E. F. W. ALEXANDERSON.
HIGH FREQUENCY ALTERNATOR.
APPLICATION FILED DEC. 7, 1912.

1,110,029.

Patented Sept. 8, 1914.

Witnesses:
Earl G. Klock.
J. Ellis Glen

Inventor:
Ernst F. W. Alexanderson,
by Albert G. Davis
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

HIGH-FREQUENCY ALTERNATOR.

1,110,029.   Specification of Letters Patent.   Patented Sept. 8, 1914.

Original application filed October 19, 1911, Serial No. 655,480. Divided and this application filed December 7, 1912. Serial No. 735,357.

*To all whom it may concern:*

Be it known that I, ERNST F. W. ALEXANDERSON, a citizen of the United States, residing at Schenectady, county of Schenectady, State of New York, have invented certain new and useful Improvements in High-Frequency Alternators, of which the following is a specification.

My invention relates to high frequency alternators of the type disclosed in Patent, No. 1,008,577 issued to me.

The present application is a division of my application, Ser. No. 655,480 filed October 19, 1911.

The present invention relates particularly to a novel construction of rotor or inductor adapted to be employed in a high frequency alternator of the type disclosed in my aforementioned patent.

The novel features of this invention will be best understood by reference to the accompanying drawings, in which—

Figure 1:
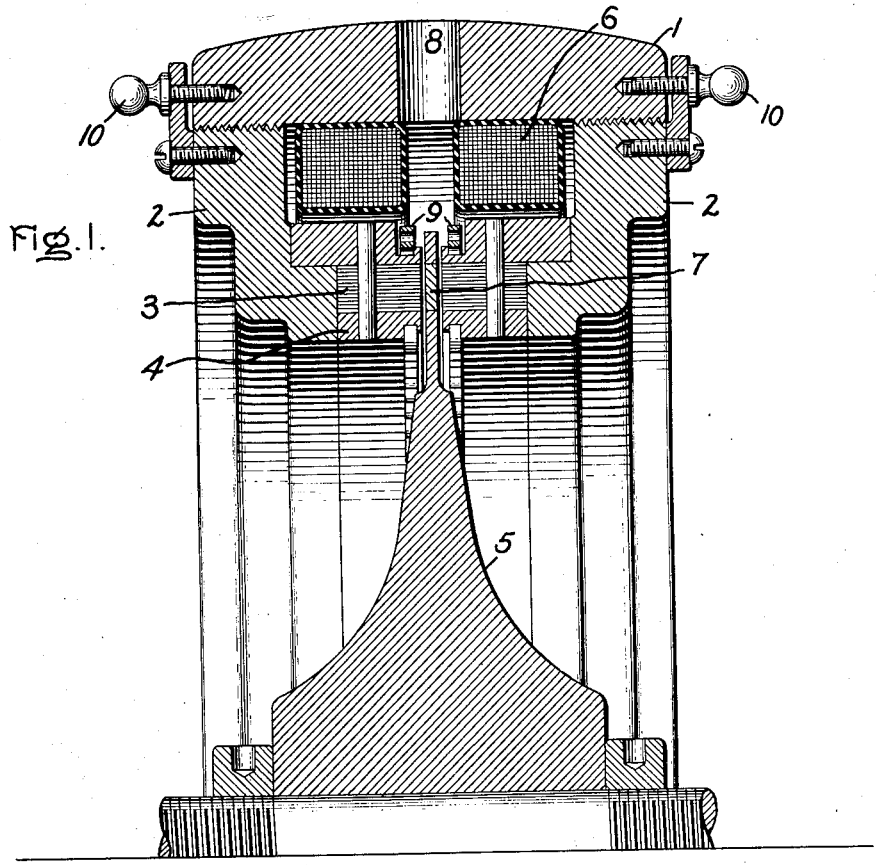
Figure 2:
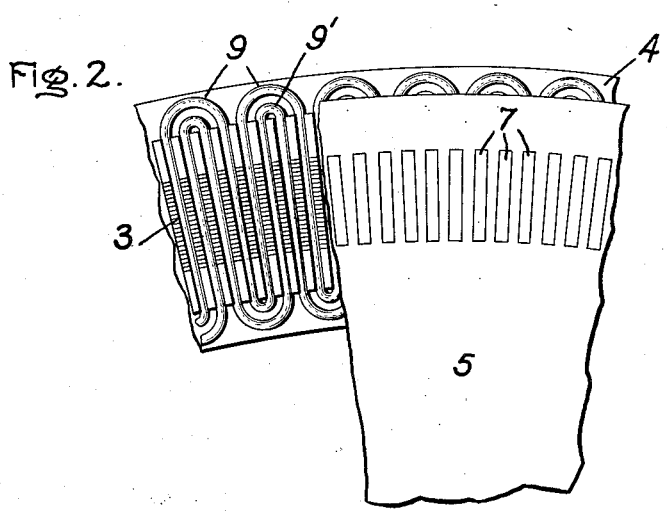

Figure 1 shows a vertical cross section of the upper half of a high frequency alternator embodying the features of my invention, and Fig. 2 shows an enlarged detail view.

In the drawings 1 represents the stator into which are screw threaded a pair of ring shaped members 2—2. Each of these members carries a circumferentially extended laminated ring 3 clamped between two rings 4. These laminated rings have opposite faces lying in adjacent radial planes. Between these rings extends the periphery of the rotor which comprises a solid magnetic inductor 5; 6 represents the field coils, the magnetic circuit of which surrounds the coils and passes through the laminated rings 3 and the periphery of the inductor 5. The air gaps between the inductor and laminated rings lie in radial planes. The inductor 5 near its periphery is cut through so as to form rectangular holes or radial slots as is best shown in Fig. 2, so that magnetic poles are adapted to be formed between these holes or slots. In order to avoid excessive windage at the highest speeds at which the inductor is designed to operate, the slots in the inductor periphery are filled with solid non-magnetic blocks 7 which may be composed of aluminum or other similar material and which are riveted into the slots so as to fill them flush with the sides of the inductor. The slots do not extend to the periphery of the inductor, which is therefore left as a continuous ring integral with the rest of the inductor and holds the blocks 7 from displacement by centrifugal force. This gives a mechanically strong construction and a smooth surface to the inductor so as to reduce the windage to a small amount. Ventilating holes 8 are provided in the stator opposite the periphery of the inductor.

The armature winding is carried in slots in the faces of the laminated rings 3 adjacent the inductor poles. This armature winding as shown in Fig. 2 comprises in effect two windings 9 and 9′ which are carried zig-zag across the faces of the laminated rings 3, the adjacent loops or coils of each winding being placed not in adjacent slots but displaced from each other by a certain number of slots.

As has already been pointed out the supporting members 2 of the laminated rings 3 are screw threaded into the stator 1. The purpose of this is to make each of the laminated rings axially adjustable toward or away from the inductor so as to adjust the air gap. The members 2 when properly adjusted may be locked by the pins 10 carried by the members 2 and adapted to enter into any one of a circumferential series of holes in the side of the stator.

I do not desire to limit myself to the particular construction and arrangement of parts shown and described, but aim in the appended claims to cover all modifications which are within the scope of my invention.

What I claim as new and desire to secure by Letters Patent of the United States, is:

1. A rotor for a high frequency alternator comprising a solid magnetic inductor adapted to be driven at high speed and having approximately radial slots whereby magnetic poles are adapted to be formed between said slots, said slots extending near to, but not to, the periphery whereby the periphery is left as a continuous ring integral with the rest of the inductor.

2. A rotor for a high frequency alternator comprising a solid magnetic inductor adapted to be driven at high speed and having approximately radial slots whereby magnetic poles are adapted to be formed between said slots, said slots extending near to, but not to, the periphery whereby the periphery is left as a continuous ring integral with the rest of the inductor, and non-magnetic solid blocks filling said slots from side to side of said inductor.

3. A high frequency alternator, comprising a stator carrying a pair of circumferentially extending laminated rings having opposite faces lying in adjacent radial planes, a winding carried in said faces, a solid magnetic inductor adapted to be driven at high speed having its periphery extending between said faces and having approximately radial slots extending axially through it opposite said faces whereby magnetic poles are adapted to be formed between said slots, said slots extending near to, but not to, the periphery whereby the periphery is left as a continuous ring integral with the rest of the inductor, and non-magnetic solid blocks filling said slots from side to side of said inductor.

4. A high frequency alternator, comprising a stator carrying a pair of circumferentially extending laminated rings having opposite faces lying in adjacent radial planes, a winding carried in said faces, a solid magnetic inductor adapted to be driven at high speed having its periphery extending between said faces and having approximately radial slots extending axially through it opposite said faces whereby magnetic poles are adapted to be formed between said slots, said slots extending near to, but not to the periphery whereby the periphery is left as a continuous ring integral with the rest of the inductor, and non-magnetic solid blocks, of the same thickness as the inductor where it is slotted, riveted into said slots so as to fill them evenly with the sides of the inductor.

In witness whereof, I have hereunto set my hand this 5th day of December, 1912.

ERNST F. W. ALEXANDERSON.

Witnesses:
BENJAMIN B. HULL,
HELEN ORFORD.